United States Patent
Sung et al.

(10) Patent No.: US 7,274,874 B2
(45) Date of Patent: Sep. 25, 2007

(54) IDLE-PATTERN OUTPUT CONTROL CIRCUIT USED IN A GIGABIT ETHERNET-PASSIVE OPTICAL NETWORK

(75) Inventors: Whan-Jin Sung, Suwon-shi (KR); Tae-Sung Park, Suwon-shi (KR); Shin-Hee Won, Seoul (KR); Min-Hyo Lee, Suwon-shi (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 657 days.

(21) Appl. No.: 10/354,621

(22) Filed: Jan. 30, 2003

(65) Prior Publication Data

US 2003/0147654 A1 Aug. 7, 2003

(30) Foreign Application Priority Data

Feb. 1, 2002 (KR) .................. 10-2002-0005875

(51) Int. Cl.
*H04B 10/20* (2006.01)
(52) U.S. Cl. ........................................ 398/58
(58) Field of Classification Search ............... 398/72, 398/58, 63, 66, 67, 78, 168; 725/129
See application file for complete search history.

(56) References Cited

U.S. PATENT DOCUMENTS

| | | | | |
|---|---|---|---|---|
| 5,206,857 A | * | 4/1993 | Farleigh | 370/452 |
| 5,684,960 A | * | 11/1997 | Geyer et al. | 370/252 |
| 5,812,594 A | * | 9/1998 | Rakib | 375/219 |
| 6,075,814 A | | 6/2000 | Yamano et al. | 375/222 |
| 6,324,611 B1 | * | 11/2001 | Nyu | 710/305 |
| 6,470,032 B2 | * | 10/2002 | Dudziak et al. | 370/503 |
| 6,804,256 B2 | * | 10/2004 | Chang | 370/468 |
| 2002/0181571 A1 | * | 12/2002 | Yamano et al. | 375/222 |
| 2004/0028405 A1 | * | 2/2004 | Unitt et al. | 398/32 |

FOREIGN PATENT DOCUMENTS

| | | |
|---|---|---|
| EP | 0765045 A1 | 3/1997 |
| JP | 2003-224573 | 8/2003 |

OTHER PUBLICATIONS

"Ethernet Passive Optical Network (EPON): Building a Next-Generation Optical Access Network;" Glen Kramer et al.; IEEE Communications Magazine, vol. 40, No. 2; Feb. 2002; XP001125420; 8 pages.

"An Experimental Investigation of the Active-Idle Pattern of Speech over Land Mobile Radio Telephone Channels;" David Haccoun et al.; IEEE Transactions on Vehicular Technology, vol. VT-32, No. 4; Nov. 1983; XP000796683; 9 pages.

* cited by examiner

*Primary Examiner*—Jason Chan
*Assistant Examiner*—Quan-Zhen Wang
(74) *Attorney, Agent, or Firm*—Cha & Reiter, LLC

(57) ABSTRACT

An idle pattern output-control circuit used in a point-to-multipoint communication based Gigabit Ethernet-passive optical network (GE-PON) is provided. In a GE-PON having an optical-line terminal (OLT), a plurality of optical-network units (ONUs) connected to each other via an optical-distribution network (ODN), a media-access controller (MAC), and a physical-coding sublayer (PCS), in which the PCS transmits idle-pattern data to a serializer/deserializer (SERDES) when there is no data to be transmitted to the OLT, an idle-pattern output-control circuit comprising a data converter for converting an idle-pattern data generated from the PCS into a low-level optical signal for subsequent transmission to the OLT, and a switching circuit for selecting data generated from the PCS for subsequent transmission to the SERDES when there is data to be transmitted and for selecting data converted by the data converter for subsequent transmission to the SERDES when there is no data to be transmitted.

4 Claims, 3 Drawing Sheets

IDLE-PATTERN OUTPUT CONTROL CIRCUIT USED IN A GIGABIT ETHERNET-PASSIVE OPTICAL NETWORK

CLAIM OF PRIORITY

This application claims priority to an application entitled "IDLE PATTERN OUTPUT CONTROL CIRCUIT IN A GIGABIT ETHERNET-PASSIVE OPTICAL NETWORK", filed in the Korean Industrial Property Office on Feb. 1, 2002 and assigned Serial No. 2002-5875, the contents of which are hereby incorporated by reference.

BACKGROUND OF THE INVENTION

1. Field of the Invention

The present invention generally relates to a passive optical network (PON) and, in particular, to a Gigabit-Ethernet controller for use in an optical-network unit (ONU) of a Gigabit Ethernet-passive optical network (GE-PON).

2. Description of the Related Art

A PON system, which is an optical-subscriber network that is based on passive devices, has an architecture made of passive-distribution devices or wavelength-division-multiplexing (WDM) devices between a subscriber-access node, such as fiber-to-the-home (FTTH) or fiber-to-the-curb (FTTC), and a network termination (NT), in which all the nodes are distributed in the form of a bus or tree structure.

An asynchronous-transfer mode (ATM)-PON is an exemplary PON system and explained in detail in the International Telecommunication Union-T (ITU-T) G983.1. The standardization on the media-access-control (MAC) technology of the ATM-PON has been completed and is readily available. This type of technology is also well disclosed in other publications—for example, in U.S. Pat. No. 5,978,374, issued on Nov. 2, 1999, entitled "Protocol for Data Communication over a Point-to-Multipoint Passive Optical Network," and Korean Patent Application No. 1999-70901, published on Sep. 15, 1999, entitled "Protocol for an Asynchronous Transfer Mode Passive Optical Network Media Access Control."

With the development of the Internet technology, many subscribers have been demanding more bandwidth for their applications. To this end, the GE-PON system, which has relatively low costs, has been developed to provide more bandwidth during the end-to-end transmission using Gigabit Ethernet. As such, the demand is growing for the GE-PON system over an ATM system; however, this system has relatively high costs, limited bandwidth, and undesirable segmentation of an Internet-protocol packet.

FIG. 1 is a general schematic block diagram of a GE-PON. As shown, an optical line terminal (OLT) 100 is connected to a plurality of optical-network units (ONUs) 104 via an optical-distribution network (ODN) 102 using an optical splitter. Here, the OLT 100 and ONUs 104 constitute the Gigabit Ethernet. The ONU 104 is typically installed at the distribution boxes within buildings or apartment blocks, or at the entrances of houses, and connected to a network of terminals (not shown). The OLT 100 receives data from a backbone network and transmits the data to the ONUs 104 via the ODN 102 or receives data from the ONU 104 using the time-division-multiplexing (TDM) protocol.

A Gigabit-Ethernet controller must be used in the ONU 104 for a point-to-point communication. Commercially available Gigabit-Ethernet controllers are shown, for example, in FIGS. 2 and 3. As shown in FIG. 2, a Gigabit-Ethernet controller 200 includes a media-access controller (MAC) 202 and a physical-coding sublayer (PCS) 204. Similarly, as shown in FIG. 3, a Gigabit-Ethernet controller 300 includes a MAC 302, a PCS 304 and a serializer/deserializer (SERDES) 306. Unlike the Gigabit-Ethernet controller shown in FIG. 3, the Gigabit-Ethernet controller depicted in FIG. 2 must have a SERDES 206 connected to the PCS 204. An optical transceiver (not shown) is connected to the SERDESs 206 and 306 and transmits an optical signal to the OLT 100 in response to data generated from the SERDESs 206 and 306 while converting an optical signal generated from the OLT 100 into electric-signal data.

During operation, if there is no data transmission, the Gigabit-Ethernet controllers 200 and 300 automatically generate idle-pattern data instead of transmitting data in the PCSs 204 and 304. The idle-pattern data alternates between the logic "0" and "1", that is "101010 . . . ." Thus, if the Gigabit-Ethernet controllers 200 and 300 are implemented in the GE-PON, data collision may occur as some ONUs may transmit the idle-pattern data while other ONUs exchange data with the OLT 100. The data collision leads to a loss of upstream data transmitted to the OLT 100.

As such, the conventional Gigabit-Ethernet controller can not be used in the GE-PON structure that is based on the point-to-multipoint communication. Accordingly, there is a need for a new Gigabit-Ethernet controller that overcomes the above-stated problems.

SUMMARY OF THE INVENTION

The present invention relates to an idle-pattern output-control circuit that is capable of preventing data loss caused by an idle pattern in a Gigabit-Ethernet controller used in a point-to-multipoint communication.

According to one aspect of the invention, an idle-pattern output-control circuit includes a data converter for converting an idle-pattern data generated from a PCS into a low-level optical signal in order to transmit the converted signal to an OLT, and a switching circuit for selecting transmission data generated from the PCS for transmission to a SERDES when there is data to be transmitted, and for selecting data converted by the data converter for transmission to the SERDES when there is no data to be transmitted.

BRIEF DESCRIPTION OF THE DRAWINGS

The above and other features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. For the purposes of clarity and simplicity, well-known functions or constructions are not described in detail, as they would obscure the invention in unnecessary detail.

Figure 1:
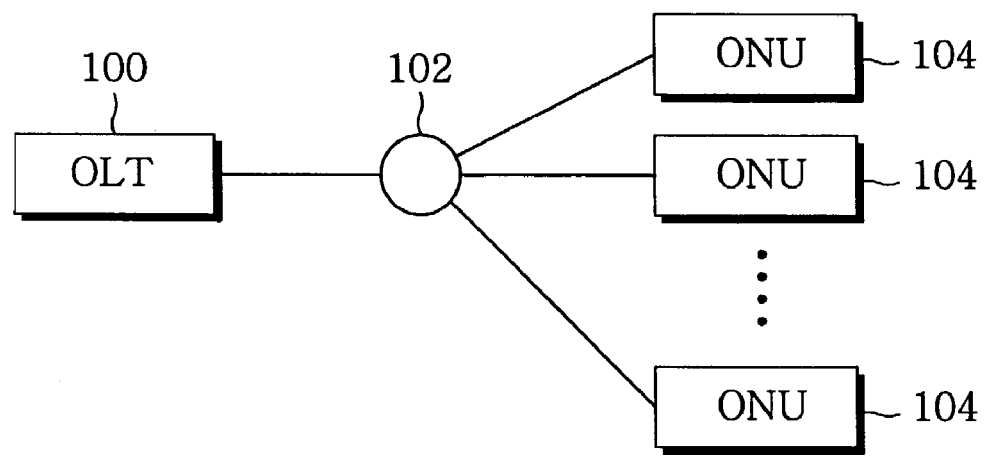
FIG. 1 is a general schematic block diagram of a GE-PON.

FIG. 1 shows a simplified Gigabit Ethernet-passive optical network (GE-PON) whereto the embodiment of the present invention may be applied.

In order to facilitate an understanding of this invention, a conventional method of signal processing will be described in conjunction with FIG. 1.

In operation, each of the ONUs 104 requests for the required bandwidth for the transmission of data to the OLT 100. In response, the OLT 100 performs a "scheduling" operation to divide and assign the required bandwidth that the ONUs 104 requested. The ONUs 104 transmit data to the OLT 100 within the bandwidth assigned thereto. Here, the term, "bandwidth", in the context of GE-PON represents the time-slot assigned to transmit data to the ONUs by the OLT 100. Note that the bandwidth is not assigned to the ONU that does not require any data transmission to the OLT 100. For example, if three ONUs are connected to the OLT 100 and the bandwidth assignment is performed to all of the ONUs, a duration from t0-t1 is assigned to the first ONU, a duration from t1 to t2 is assigned to the second ONU, and a duration from t2-t3 is assigned to the third ONU. These three time slots can be fixed or dynamically assigned to the ONUs.

Now, a description will be made in detail in regards to this invention with reference to FIG. 4.

Figure 2:
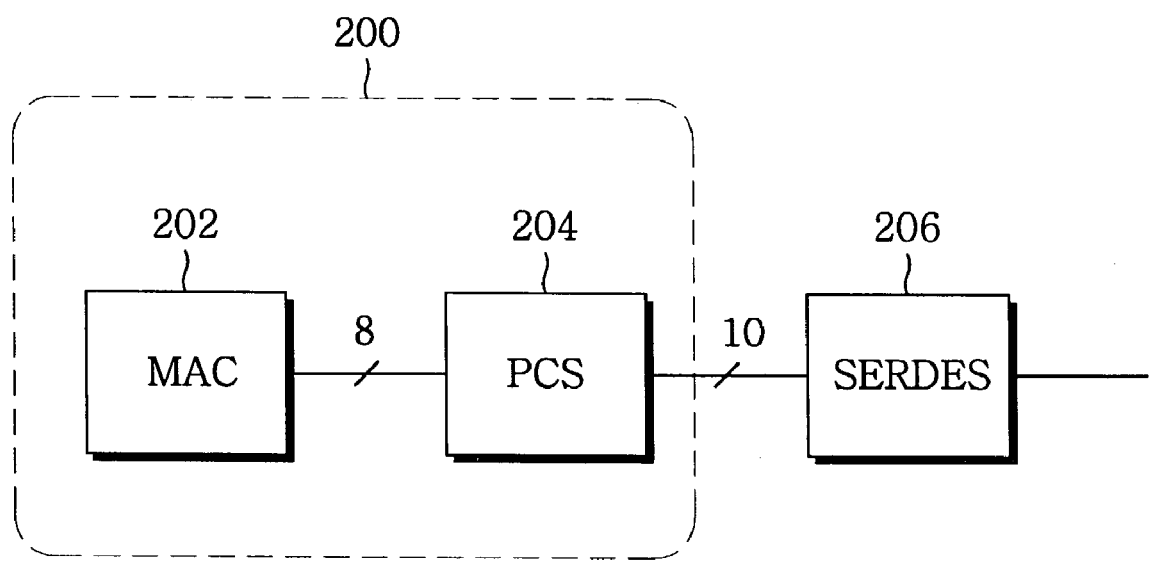
FIGS. 2 and 3 are block diagrams of conventional Gigabit-Ethernet controllers; and, FIG. 4 is a block diagram illustrating an idle-pattern output-control circuit in accordance with an embodiment of the present invention.
Figure 3:
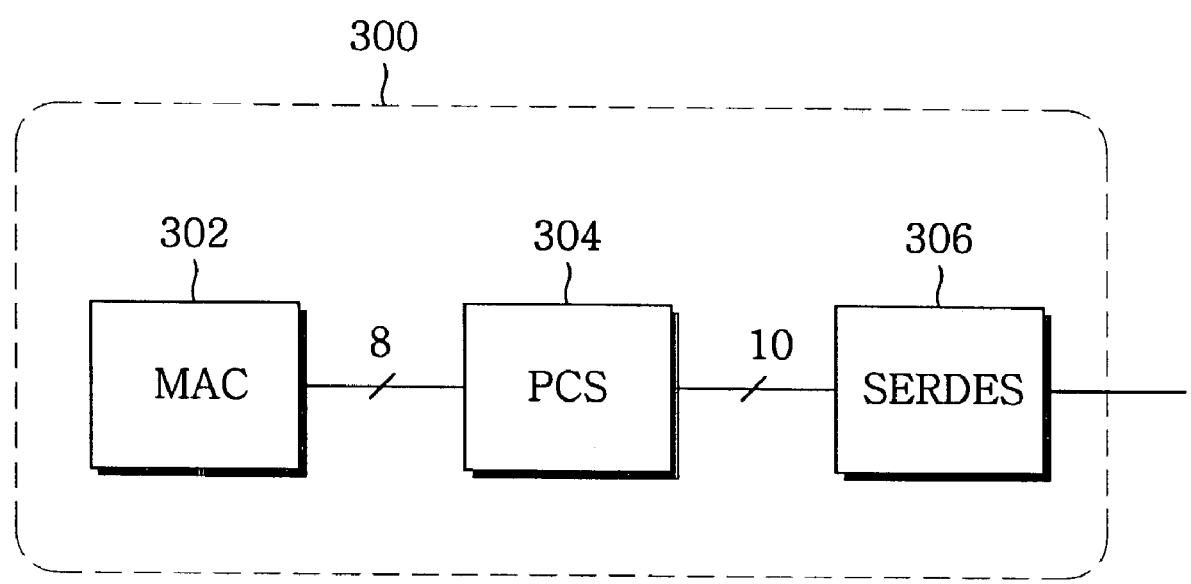
Figure 4:
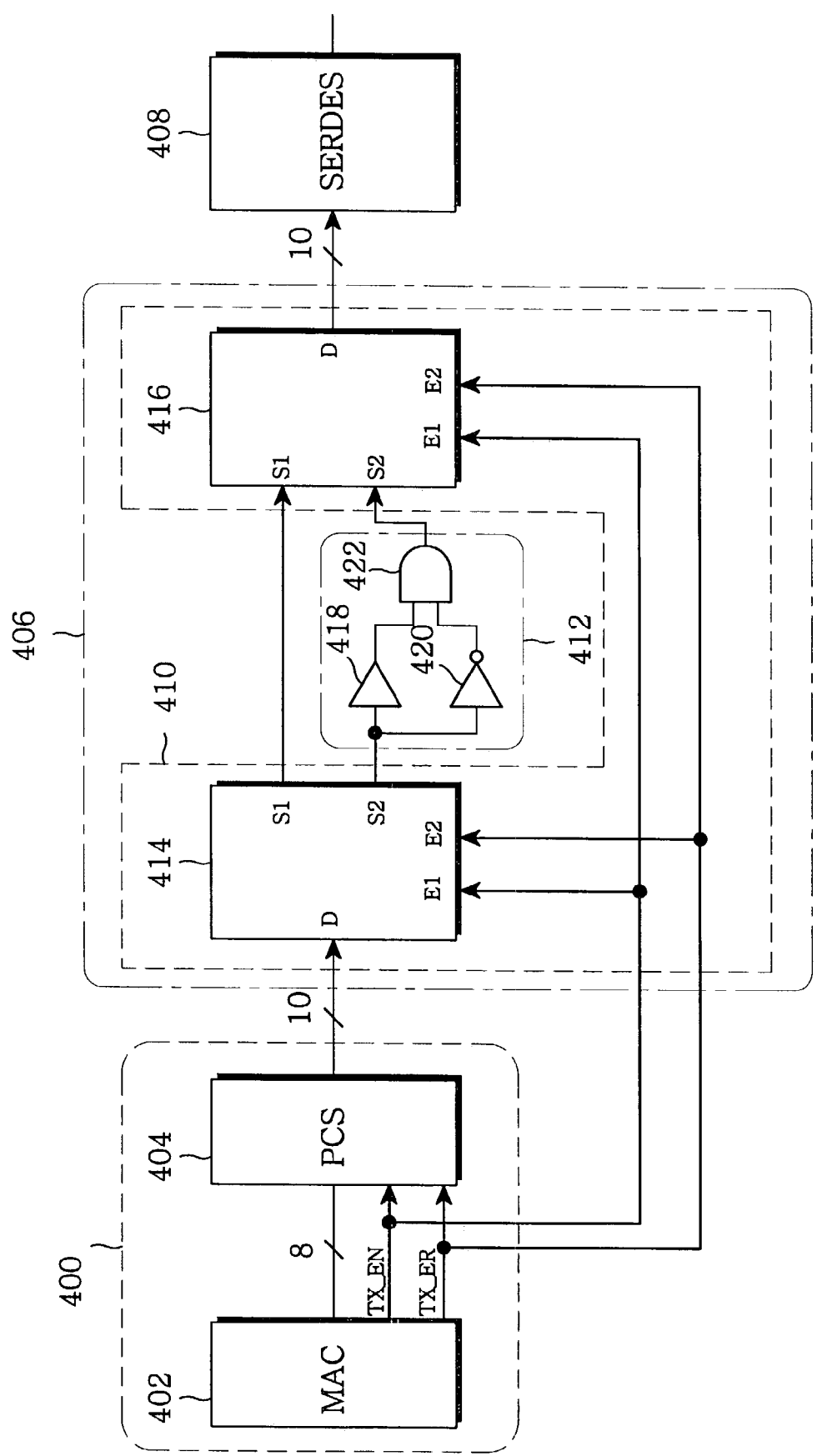

Referring to FIG. 4, an idle-pattern output-control circuit 406 according to the embodiment of the present invention includes a switching circuit 410 and a data converter 412 and is connected between the PCS 404 of a conventional Gigabit-Ethernet controller 400 and a SERDES 408. The Gigabit-Ethernet controller 400 includes a PCS 404 and a MAC 402. Data generated from the Gigabit-Ethernet controller 400 is applied to an optical transceiver (not shown) via the idle-pattern output-control circuit 406 and the SERDES 408, then the optical transceiver oscillates the received optical signal and transmits it to the OLT 100, as illustrated in FIG. 1. Note that the Gigabit-Ethernet controller 400 may be an equivalent Gigabit-Ethernet controller 200 or 300 shown in FIG. 2 or 3. If the Gigabit-Ethernet controller 200 of FIG. 2 is used, an output terminal of PCS 204 is connected to an input terminal of the idle-pattern output control circuit 406, and an output terminal of the idle-pattern output control circuit 406 is connected to the SERDDES 400. However, if the Gigabit-Ethernet controller 300 of FIG. 3 is used a node between the PCS 304 and the SERDES 306 is connected to an input terminal of the idle-pattern output-control circuit 406, and an output terminal of the idle-pattern output-control circuit 406 is connected to the SERDES 408, instead of the SERDES 306.

It should be noted that the present invention does not cover the scenarios of an optical signal being received from the OLT 100 or any data in response to the optical signal applied to the Gigabit-Ethernet controller 400 via the SERDES 408. However, it should be noted that the teachings of the present invention is also applicable in such scenarios.

With continued reference to FIG. 4, the data converter 412 includes a buffer 418, an inverter 420, and an AND gate 422 and serves to convert the idle-pattern data generated by the PCS 404 into a low-level optical signal and transmit the converted low-level optical signal to the OLT 100 (see FIG. 1). The switching circuit 410 includes a 1:2 switch 414 and a 2:1 switch 416. The terminal D of the switch 414 is connected to an output terminal of the PCS 404. The respective terminals S1 of the switches 414 and 416 are connected to each other. The terminal S2 of the switch 414 is connected to an input terminal of the data converter 412, and the terminal S2 of the switch 416 is connected to an output terminal of the data converter 412. Further, the terminal D of the switch 416 is connected to an input terminal of the SERDES 408. If there is data transmission, the switching circuit 410 selects data generated by the PCS 404 and provides it to the SERDES 408. However, if there is no data transmission, the switching circuit 410 selects the converted low-level optical signal by the data converter 412 and provides it to the SERDES 408.

The operation of the switching circuit 410 is controlled by a transmission-enable signal TX_EN and a transmission-error signal TX_ER which are generated from the MAC 402 of the Gigabit-Ethernet controller 400 and supplied to the PCS 404. The switches 414 and 416 receive the transmission-enable signal TX_EN through the terminals E1 and the transmission-error signal TX_ER through the terminals E2. If both the transmission-enable signal TX_EX and the transmission-error signal TX_ER are logic "0", the switches 414 and 416 drive the respective terminals D and S2. If the transmission-enable signal TX_EN is logic "1", the switches 414 and 416 drive the respective terminals D and S1.

If there is data transmission, the MAC 402 of the Gigabit-Ethernet controller 400 generates the transmission-enable signal TX_EN of logic "1", but if there is no data transmission—that is, if it is under a data transmission-completed state or idle state—it generates the transmission-enable signal TX_EN of logic "0." Further, if there is no error during the transmission, the MAC 402 of the Gigabit-Ethernet controller 400 generates the transmission-error signal TX_ER of logic "0", and if there is an error it generates the transmission-error signal TX_ER of logic "1".

If the transmission-enable signal TX_EN is logic "0" and the transmission-error signal TX_ER is logic "0", the data has been transmitted or there is no data to be transmitted; then the PCS 404 generates the idle pattern-data of "10101010 . . . ." The generated idle-pattern data is applied to two paths—the inverter 420 and the buffer 418, then combined by the AND gate 422. Therefore, the data of "000000 . . . " rather than the idle pattern is supplied to the SERDES 408.

Accordingly, if the first ONU is transmitting, the other ONUs during their assigned time slots are in the idle state. In this case, when data to be transmitted to the OLT 100 by the first ONU is logic "1", a high-level optical fiber signal is transmitted to the OLT 100 from the first ONU. At this time, as other ONUs are in idle state, a low-level optical signal is transmitted by the idle ONUs. Note that the intensity of low-level optical signal is lower than the high-level optical fiber. Thus, since the OLT 100 receives the optical signals combined by the high-level optical signal transmitted from the first ONU and the low-level optical signals transmitted from the other ONUs, the OLT recognizes the received signal as a high-level optical signal is received.

In contrast, when data to be transmitted to the OLT 100 by the first ONU is logic "0"), a low-level optical signal is transmitted to the OLT 100 from the first ONU. Thus, the OLT 100 receives optical signals combined by the low-level optical signal transmitted from the first ONU and the low-level optical signals from the other ONUs. As all of the low-level signals are combined, thus yielding extremely low-level optical signals, the OLT 100 recognizes the received signal as a low-level optical signal.

Meanwhile, if the transmission-enable signal TX_EN is logic "1" indicating a data-transmission state, the data generated from the PCS 404 is applied to the terminal S1 of the switch 416 via the terminal S1 of the switch 414 and thereafter applied to the SERDES 408 via the terminal D of the switch 416. That is, the data generated from the PCS 404 is directly applied to the SERDES 408 without passing through the data converter 412, thereby normally transmitting the optical signal in response to the transmission data to the OLT 100. Therefore, the present invention can prevent loss of data caused by an idle pattern by connecting a simple circuit to the commercial Gigabit-Ethernet controller.

While the invention has been shown and described with reference to a certain preferred embodiment thereof, it will be understood by those skilled in the art that various changes in form and details may be made therein without departing from the spirit and scope of the invention as defined by the appended claims. For example, the optical transceiver which is connected to the output terminal of the SERDES 408 and transmits the high-level optical signal under the transmission data of logic "1" and the low-level optical signal under the transmission data of logic "0" may be applied also to the opposite data-logic state and optical-signal level. In that case, a NAND gate is used instead of the AND gate 422 of the data converter 412.

What is claimed is:

1. An idle-pattern output-control circuit used in a Gigabit Ethernet-passive optical network having at least one optical-line terminal (OLT) and a plurality of optical-network units (ONUs) connected as a Gigabit Ethernet to each other via an optical-distribution network (ODN), said ONU including a media-access controller (MAC) and a physical-coding sub-layer (PCS), said PCS configured to transmit data to a serializer/deserializer (SERDES), said idle-pattern output-control circuit comprising:

a data converter configured to convert an idle-pattern data into a low-level optical signal, said data converter including an inverter configured to invert said idle-pattern data, a buffer configured to buffer said idle-pattern data to correspond to a time delay of data passing through said inverter, and an AND gate configured to combine outputs of said inverter and said buffer; and a switching circuit being coupled to said PCS and said data converter, the switching circuit being configured to transmit data generated from said PCS to said SERDES if there is data to be transmitted, and being configured to transmit the low-level optical signal from said data converter to said SERDES if there is no data to be transmitted.

2. The idle-pattern output-control circuit according to claim 1, wherein the presence and absence of data to be transmitted from said switching circuit is determined by a transmission-enable signal generated from said MAC.

3. The idle-pattern output-control circuit according to claim 2. wherein said idle-pattern data is alternatively repeated data of logic "1" and "0", and wherein said data converted by said data converter is consecutively repeated data of logic "0".

4. The idle-pattern output-control circuit according to claim 1, wherein said switching circuit comprises a 1:2 switch and a 2:1 switch.

* * * * *